United States Patent
Moon et al.

(10) Patent No.: US 11,698,813 B2
(45) Date of Patent: Jul. 11, 2023

(54) ELECTRONIC DEVICE AND METHOD FOR MANAGING COMPUTING RESOURCES OF AT LEAST ONE CLOUD SERVER FOR PROVIDING CLOUD SERVICE

(71) Applicant: SAMSUNG ELECTRONICS CO., LTD., Suwon-si (KR)

(72) Inventors: Jae-min Moon, Seoul (KR); Tae-jeoung Kim, Hwaseong-Si (KR); Se-yong Um, Seoul (KR); You-ri Jeong, Seoul (KR); Ho-sup Choi, Gwacheon-Si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 153 days.

(21) Appl. No.: 16/762,715

(22) PCT Filed: Aug. 7, 2018

(86) PCT No.: PCT/KR2018/008927
§ 371 (c)(1),
(2) Date: May 8, 2020

(87) PCT Pub. No.: WO2019/103280
PCT Pub. Date: May 31, 2019

(65) Prior Publication Data
US 2021/0173708 A1    Jun. 10, 2021

(30) Foreign Application Priority Data
Nov. 23, 2017  (KR) .................. 10-2017-0157500

(51) Int. Cl.
*G06F 9/50*       (2006.01)
*H04L 67/10*      (2022.01)

(52) U.S. Cl.
CPC .............. *G06F 9/50* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,804,890 B1 | 10/2017 | Pai et al. | |
| 10,795,715 B2 * | 10/2020 | Ahmad | ............ G06F 9/4843 |

(Continued)

FOREIGN PATENT DOCUMENTS

| | | |
|---|---|---|
| CN | 103701889 | 4/2014 |
| CN | 104391736 | 3/2015 |

(Continued)

OTHER PUBLICATIONS

WO 2016/056760 (Year: 2016).*

(Continued)

*Primary Examiner* — June Sison
(74) *Attorney, Agent, or Firm* — Nixon & Vanderhye, P.C.

(57) ABSTRACT

Provided is an electronic device for managing computing resources of at least one cloud server that provides a cloud service by using a virtual machine instance including a communicator configured to receive, from a client device, at least one service request for a service provided by the virtual machine instance; and a controller configured to select one of a plurality of modes of the virtual machine instance for management of the computing resources, based on the at least one service request, and control the computing resources allocated to the virtual machine instance according to the selected mode of the virtual machine instance, wherein the virtual machine instance is generated by the at least one cloud server.

13 Claims, 10 Drawing Sheets

(56) References Cited

U.S. PATENT DOCUMENTS

| | | | |
|---|---|---|---|
| 2013/0247034 A1* | 9/2013 | Messerli | G06F 9/505 |
| | | | 718/1 |
| 2014/0207918 A1 | 7/2014 | Kowalski et al. | |
| 2015/0143362 A1* | 5/2015 | Lukacs | G06F 9/4843 |
| | | | 718/1 |
| 2016/0191411 A1 | 6/2016 | Kim et al. | |
| 2016/0246639 A1 | 8/2016 | Voccio et al. | |
| 2016/0266926 A1 | 9/2016 | Kania et al. | |
| 2017/0199564 A1* | 7/2017 | Saxena | G06F 1/3296 |
| 2021/0019173 A1* | 1/2021 | Song | H04L 61/2503 |
| 2021/0263762 A1* | 8/2021 | Kachare | G06F 12/0862 |
| 2021/0389966 A1* | 12/2021 | Wang | G06F 9/45558 |

FOREIGN PATENT DOCUMENTS

| | | |
|---|---|---|
| JP | 2010-224914 | 10/2010 |
| KR | 10-2015-0110688 | 10/2015 |
| KR | 10-2016-0083305 | 7/2016 |
| KR | 10-2017-0078012 | 7/2017 |

OTHER PUBLICATIONS

International Search Report dated Nov. 13, 2018 in counterpart International Application No. PCT/KR2018/008927 and English-language translation.

Written Opinion dated Nov. 13, 2018 in counterpart International Application No. PCT/KR2018/008927 and English-language translation.

Part 11: Understanding Amazon Elastic Block Store Snapshots, posted by Harish Ganesan, Apr. 11, 2013, 3 pages.

Li, Bo et al. "EnaCloud: An Energy-Saving Application Live Placement Approach for Cloud Computing Environments," 2009 IEEE International Conference on Cloud Computing, Jan. 2009, pp. 17-24.

"Horizontal Pod Autoscaler," Aug. 2018, 8 pages.

Notice of Non-Final Rejection dated Apr. 5, 2022 in KR Application No. 10-2017-0157500 and English-language translation.

Written Decision on Registration dated Sep. 20, 2022 in KR Application No. 10-2017-0157500 and English-language translation.

* cited by examiner

ELECTRONIC DEVICE AND METHOD FOR MANAGING COMPUTING RESOURCES OF AT LEAST ONE CLOUD SERVER FOR PROVIDING CLOUD SERVICE

This application is the U.S. national phase of International Application No. PCT/KR2018/008927 filed 7 Aug. 2018, which designated the U.S. and claims priority to KR Patent Application No. 10-2017-0157500 filed 23 Nov. 2017, the entire contents of each of which are hereby incorporated by reference.

TECHNICAL FIELD

The present disclosure relates to an electronic device and a method for managing computing resources of at least one cloud server for providing a cloud service.

BACKGROUND ART

Users may use cloud services by using a software environment without being limited by fixed hardware, such as cloud floating in an Internet environment. For example, a user may set a cloud account, upload data to the cloud account, and easily access the uploaded data at any place connected to a network.

Cloud services may be classified in a variety of ways. For example, cloud services may be classified as Software as a Service (SaaS), Platform as a Service (PaaS), and Infrastructure as a Service (IaaS). Here, SaaS refers to a service that lends an application to a user, PaaS refers to a service that lends a platform to a user, and IaaS refers to a service provided for a user to use cloud computing resources by using a virtual machine instance configured to generate a hardware resource, an operating system, and software, which are required by the user, as a virtualization environment.

A computing resource is usually a hardware resource such as a CPU, memory, and storage, or includes development platforms, application programs, etc. A cloud computing resource refers to computing resources of at least one cloud server allocated to a virtual machine instance to provide a cloud service.

Meanwhile, a company that provides a cloud service needs to provide the cloud service in a state where a user is able to use the service at any time. That is, a device providing the cloud service needs to allocate cloud computing resources to the virtual machine instance even when a user has not accessed at least one cloud server providing the cloud service for a long time. As a result, there is a problem in that the cost of operating the cloud service increases because cloud computing resources are not utilized efficiently.

SUMMARY

Controlling computing resources of at least one cloud server that provides a cloud service using a virtual machine instance is provided.

Reducing the cloud service operating costs by efficiently controlling computing resources of at least one cloud server is also provided.

The technical solution of the present disclosure is not limited to the above-described technical problems, and other technical problems may be deduced from the following embodiments.

According to an aspect of the present disclosure, an electronic device for managing computing resources of at least one cloud server that provides a cloud service by using a virtual machine instance includes a communicator configured to receive at least one service request for a service provided by the virtual machine instance from a client device; and a controller configured to select one of a plurality of modes of the virtual machine instance for management of the computing resources, based on at least one of a time at which the service corresponding to the at least one service request is provided and a characteristic of the service corresponding to the at least one service request, change a mode of the virtual machine instance to the selected mode and control the computing resources allocated to the virtual machine instance according to the selected mode of the virtual machine instance, wherein the virtual machine instance is generated by the at least one cloud server.

The time at which the service corresponding to the at least one service request is provided may include at least one of a time at which the service starts, a time for which the service is maintained, and a time between after providing of the service ends and before the service is provided again.

The characteristic of the service may include at least one of importance of the service, a frequency of use of the service, a type of the service, and a property of the service.

The controller may set at least one of a time at which the service starts, a time for which the service is maintained, and a time between after providing of the service ends and before the service is provided again, based on the characteristic of the service provided by the virtual machine instance, and select the mode of the virtual machine instance based on the setting.

When the time at which the set service starts corresponds to a current time, the controller may select the mode of the virtual machine instance.

The controller may select the mode of the virtual machine instance in consideration of the characteristic of the service when providing of the service corresponding to the at least one service request is completed by the virtual machine instance.

The controller may control the computing resources allocated to the virtual machine instance by activating or deactivating at least some of the computing resources allocated to the virtual machine instance.

The controller may control the computing resources allocated to the virtual machine instance by migrating data stored in some of the computing resources allocated to the virtual machine instance to other ones.

The controller may additionally generate a virtual machine instance that provides the service based on the at least one service request and allocate computing resources to the generated virtual machine instance.

The controller may adjust computing resources allocated to at least one virtual machine instance that provides the service based on the at least one service request.

According to another aspect of the present disclosure, a method of managing computing resources of at least one cloud server that provides a cloud service by using a virtual machine instance includes receiving at least one service request for a service provided by the virtual machine instance from a client device; selecting one of a plurality of modes of the virtual machine instance for management of the computing resources, based on at least one of a time at which the service corresponding to the at least one service request is provided and a characteristic of the service corresponding to the at least one service request; changing a mode of the virtual machine instance to the selected mode; and controlling the computing resources allocated to the virtual machine instance according to the selected mode of the virtual machine instance, wherein the virtual machine instance is generated by the at least one cloud server.

The time at which the service corresponding to the at least one service request is provided may include at least one of a time at which the service starts, a time for which the service is maintained, and a time between after providing of the service ends and before the service is provided again.

The characteristic of the service may include at least one of importance of the service, a frequency of use of the service, a type of the service, and a property of the service.

The selecting of one of the plurality of modes of the virtual machine instance may include setting at least one of a time at which the service starts, a time for which the service is maintained, and a time between after providing of the service ends and before the service is provided again, based on the characteristic of the service provided by the virtual machine instance; and selecting the mode of the virtual machine instance based on the setting.

The selecting of one of the plurality of modes of the virtual machine instance may include selecting the mode of the virtual machine instance when the time at which the set service starts corresponds to a current time.

The selecting of one of the plurality of modes of the virtual machine instance may include selecting the mode of the virtual machine instance in consideration of the characteristic of the service when providing of the service corresponding to the at least one service request is completed by the virtual machine instance.

The controlling of the computing resources allocated to the virtual machine instance may include controlling the computing resources allocated to the virtual machine instance by activating or deactivating at least some of the computing resources allocated to the virtual machine instance.

The controlling of the computing resources allocated to the virtual machine instance may include controlling the computing resources allocated to the virtual machine instance by migrating data stored in some of the computing resources allocated to the virtual machine instance to other ones.

The method may further include additionally generating a virtual machine instance that provides the service based on the at least one service request and allocating computing resources to the generated virtual machine instance.

The method may further include adjusting computing resources allocated to at least one virtual machine instance that provides the service based on the at least one service request.

According to another aspect of the present disclosure, provided is a computer program product including a computer readable storage medium, wherein the computer readable storage medium includes instructions for performing a method of managing computing resources of at least one cloud server that provides a cloud service by using a virtual machine instance, wherein the method of managing the computing resources of the at least one cloud server includes receiving at least one service request for a service provided by the virtual machine instance from a client device; selecting one of a plurality of modes of the virtual machine instance for management of the computing resources, based on at least one of a time at which the service corresponding to the at least one service request is provided and a characteristic of the service corresponding to the at least one service request; changing a mode of the virtual machine instance to the selected mode; and controlling the computing resources allocated to the virtual machine instance according to the selected mode of the virtual machine instance, and wherein the virtual machine instance is generated by the at least one cloud server.

DETAILED DESCRIPTION OF EXAMPLE EMBODIMENTS

Figure 1:
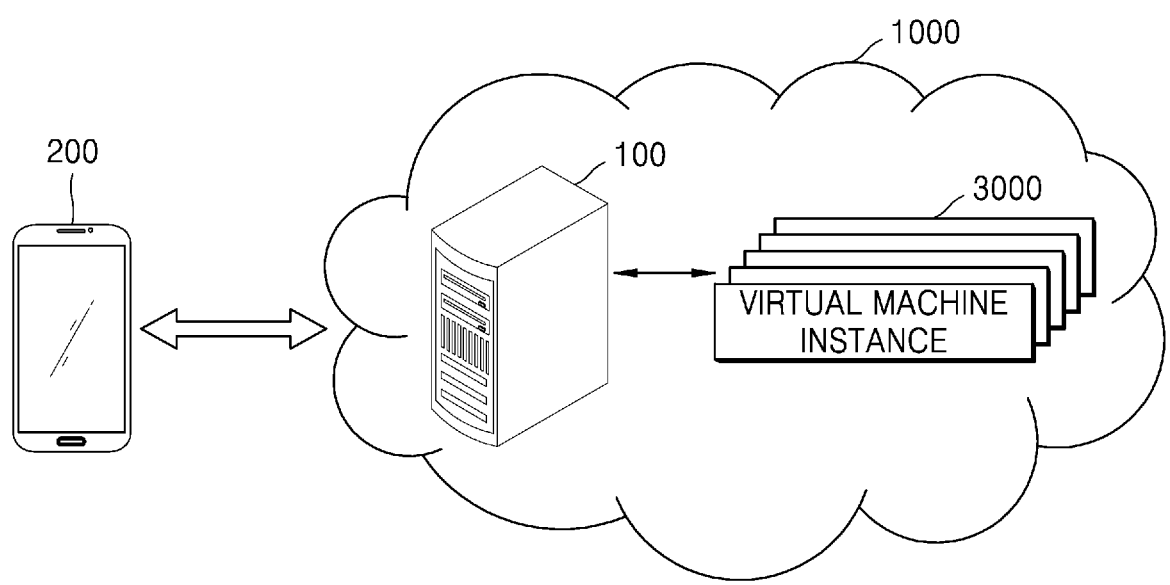
FIG. 1 is a diagram of an electronic device for providing a cloud service to a client device using a virtual machine instance, according to some embodiments.

Hereinafter, the present disclosure will be described in detail by explaining embodiments of the disclosure with reference to the attached drawings. The present disclosure may, however, be embodied in many different forms and should not be construed as being limited to the embodiments of the disclosure set forth herein. In the drawings, parts not related to the present disclosure are not illustrated for clarity of explanation, and like reference numerals denote like elements.

Some embodiments of the present disclosure may be described in terms of functional blocks and various processing steps. Some or all of the functional blocks may be implemented by any number of hardware and/or software elements configured to perform certain functions. For example, the functional blocks of the disclosure may be implemented by one or more processors or microprocessors, or circuit elements for certain functions. As another example, the functional blocks of the disclosure may be implemented using any programming or scripting language. The functional blocks may be implemented using various algorithms executed by the one or more processor. Furthermore, the present disclosure might employ known technologies for electronic settings, signal processing, and/or data processing. The words "mechanism", "element", "means", and "configuration" are used broadly and are not limited to mechanical or physical embodiments.

It will be understood that when region is referred to as being "connected to" another region, the region may be directly connected to the other region or electrically connected thereto with an intervening region therebetween. It will be further understood that the terms "comprises" and/or "comprising" used herein specify the presence of stated features or components, but do not preclude the presence or addition of one or more other features or components.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

As used herein, terms including ordinals such as 'first' or 'second' may be used to describe various elements, but the elements should not be limited by the terms. The terms are only used for the purpose of distinguishing one element from another.

Hereinafter, the present disclosure will be described in detail with reference to the accompanying drawings.

FIG. 1 is a diagram of an electronic device 100 for providing a cloud service to a client device 200 using a virtual machine instance 3000, according to some embodiments.

Referring to FIG. 1, the client device 200 may transmit a request for the cloud service to a cloud service providing device 1000. The electronic device 100 may receive the request for the cloud service from the client device 200. The electronic device 100 may transmit the request for the cloud service to the virtual machine instance 3000 corresponding to the request. The virtual machine instance 3000 executes a process corresponding to the transmitted request for the cloud service such that the cloud service providing device 1000 may provide the cloud service using the virtual machine instance 3000.

According to an embodiment, the client device 200 may include a mobile phone, a smart phone, a desktop computer, a laptop computer, a tablet PC, an electronic book terminal, a personal digital assistant (PDA), a portable multimedia player (PMP), navigation, a smart TV, an Internet Protocol Television (IPTV), a digital television (DTV), a digital broadcasting terminal, Consumer Electronics (CE) devices (e.g., a refrigerator with a display panel, an air conditioner, etc.), but is not limited thereto.

According to an embodiment, the client device 200 may transmit a request for receiving the cloud service to the cloud service providing device 1000. For example, the client device 200 may transmit the request for receiving the cloud service to the electronic device 100 that manages the cloud service.

According to an embodiment, the cloud service provided to the client device 200 may operate by generating a computer virtually. For example, the cloud service may virtually generate a web server and operate a homepage by using the generated web server. For another example, a cloud service may provide a computer that conducts tests that operate with limited computing resources. For another example, the cloud service may provide a computer that runs an automated product sorting system. For another example, the cloud service may provide a video streaming server. For another example, the cloud service may provide a computer that performs deep learning to read an image. However, this is merely an example of a cloud service that may be provided by using a cloud system, but the present disclosure is not limited thereto. It is obvious that a cloud service provided by using a cloud server may be applied according to the related art.

According to an embodiment, the electronic device 100 may manage cloud computing resources that are computing resources of at least one cloud servers 300a, 300b, and 300n that provide cloud services. Specifically, the electronic device 100 may manage computing resources of the at least one cloud servers 300a, 300b, and 300n allocated to at least one virtual machine instance 3000 to provide the cloud service by using the at least one virtual machine instance 3000.

According to an embodiment, the electronic device 100 may generate, end, and manage the virtual machine instance 3000.

According to an embodiment, the electronic device 100 may monitor an operation status of the virtual machine instance 3000.

According to an embodiment, the electronic device 100 may control virtual computing resources allocated to the virtual machine instance 3000.

According to an embodiment, the virtual machine instance 3000 may be virtual machine generated by the cloud service providing device 1000. The virtual machine instance 3000 may be virtual machine on which virtual computing resources and an operating system are mounted. Some of computing resources of at least one cloud servers 300a, 300b, and 300n that provide cloud services may be allocated to the virtual computing resources of the virtual machine instance 3000. The virtual machine instance 3000 may provide a service requested from the client device 200 using virtual computing resources.

According to an embodiment, the at least one cloud servers 300a, 300b, and 300n that provide cloud services may provide virtual computing resources to a user through the Internet in response to the service request received from the client device 200. For example, the at least one cloud servers 300a, 300b, and 300n that provide cloud services may correspond to the service request received from the client device 200 by using the virtual machine instance 3000.

According to an embodiment, the virtual computing resources of the virtual machine instance 3000 may be allocated differently based on the characteristic of the service such as the type, characteristic, importance, and frequency of use of the service provided by using the virtual machine instance 3000.

Figure 2:
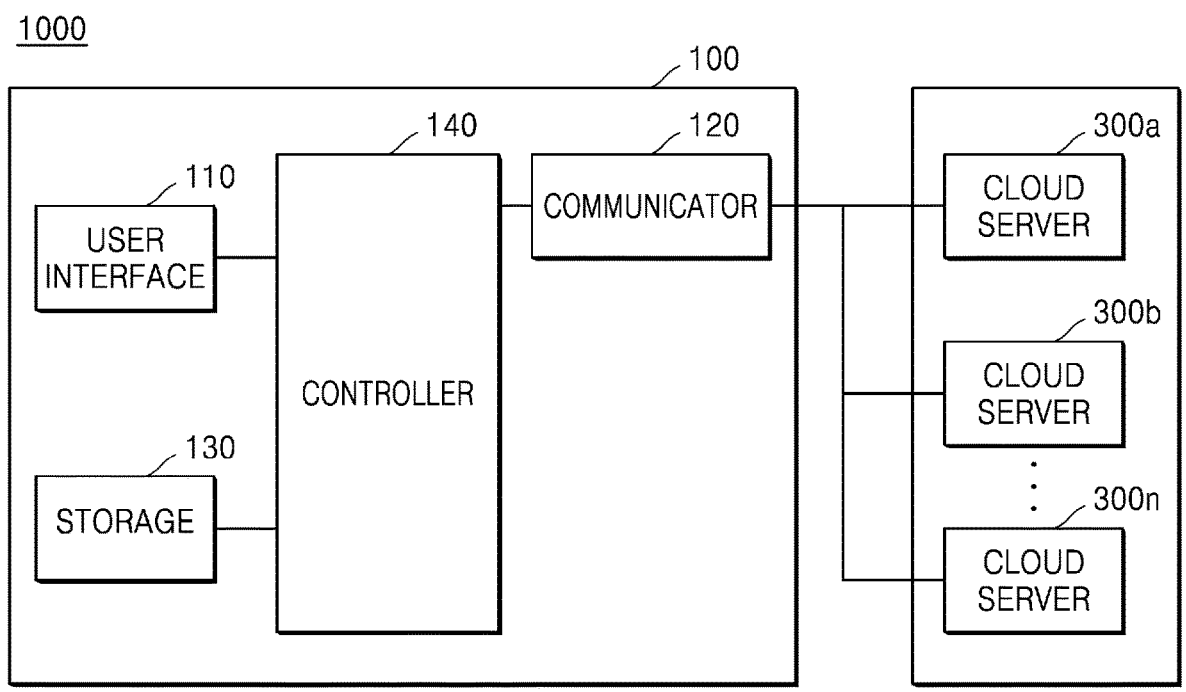
FIG. 2 is a block diagram of a cloud service providing device, according to some embodiments.

FIG. 2 is a block diagram of the cloud service providing device 1000, according to some embodiments.

Referring to FIG. 2, the cloud service providing device 1000 may include the at least one cloud servers 300a, 300b, and 300n and the electronic device 100.

According to an embodiment, the electronic device 100 may include a user interface 110, a communicator 120, a storage 130, and a controller 140. However, not all components illustrated in FIG. 2 are indispensable components of the electronic device 100. It may be understood by those skilled in the art that the cloud service providing device 1000 and the electronic device 100 may be implemented by more components than those illustrated in FIG. 2 and the cloud service providing device 1000 and the electronic device 100 may be implemented by less components than those illustrated in FIG. 2.

According to an embodiment, the electronic device 100 may be one of the at least one cloud servers 300a, 300b, and 300n that provide cloud services. Alternatively, the electronic device 100 may be the plurality of servers 300a, 300b, and 300n that provide cloud services and operate as one device. Alternatively, the electronic device 100 may be the virtual machine instance 3000 set to manage cloud computing resources.

According to an embodiment, the user interface 110 provides an interface for a user to use the electronic device 100. For example, the user interface 110 may include a user input interface for receiving input from the user and an output interface for providing information to the user.

According to an embodiment, the user input interface may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, etc., but is not limited thereto. The user input interface may also include a microphone which may be configured to receive audio (e.g., speech commands) from the user.

According to an embodiment, the output interface may output a video signal and an audio signal, and may include a display and an audio output interface, but is not limited thereto.

The display may output information processed by the electronic device 100 as a way to display the information. The display may include at least one of a liquid crystal display, a thin film transistor-liquid crystal display, an organic light-emitting diode, a flexible display, a 3D display, or an electrophoretic display.

The audio output interface may output a sound signal. Also, the audio output interface may output a sound signal related to functions (e.g., signal reception sound, alarm sound, and speech signal) performed by the electronic device 100.

According to an embodiment, the user interface 110 may not be physically connected to the electronic device 100. For example, the client device 200 may serve as the user interface 110. When the user connects to the electronic device 100 by using the client device 200, the client device 200 may operate as an input interface for receiving an input from the user or as an output interface for displaying the information processed by the electronic device 100.

According to an embodiment, the communicator 120 may communicate with the client device 200 and at least one cloud server 300. The communicator 120 may receive a service request from the client device 200. The communicator 120 may transfer the received service request to the virtual machine instance 3000. The communicator 120 may receive monitoring information about the status of the virtual machine instance 3000 from the virtual machine instance 3000 used to provide the cloud service. The communicator 120 may transmit a control command for controlling the virtual machine instance 3000 to the virtual machine instance 3000.

According to an embodiment, the storage 130 may store a program for processing and control of the controller 140 and store data input to or output from the electronic device 100.

According to an embodiment, the storage 130 may include at least one of flash memory, a hard disk, a multimedia card micro, card-type memory (e.g., secure digital (SD) or extreme digital (XD) memory), random access memory (RAM), static RAM (SRAM), read-only memory (ROM), electrically erasable programmable ROM (EEPROM), programmable ROM (PROM), magnetic memory, a magnetic disc, or an optical disc, but is not limited thereto.

According to an embodiment, the storage 130 may store information about a mode of the virtual machine instance 3000. For example, the storage 130 may store information about what mode the virtual machine instance 3000 has. For another example, the storage 130 may store information about an event for selecting the mode of the virtual machine instance 3000. For another example, the storage 130 may store a log that is a record in which the mode of the virtual machine instance 3000 has changed. For another example, the storage 130 may store information about computing resources allocated to the virtual machine instance 3000 because the mode of the virtual machine instance 3000 is determined.

According to an embodiment, the storage 130 may store information about a cloud service provided using the virtual machine instance 3000. For example, the storage 130 may store information about the service request. For another example, the storage 130 may store information about the type, property, importance, and frequency of use of the cloud service provided using the virtual machine instance 3000.

According to an embodiment, the controller 140 may generally control the user interface 110, the communicator 120, the storage 130, and the like by executing programs stored in the storage 130.

According to an embodiment, the controller 140 may control the overall operation of the virtual machine instance 3000. For example, the controller 140 may generate, end, and manage the virtual machine instance 3000. For another example, the controller 140 may monitor the operation status of the virtual machine instance 3000. That is, the controller 140 may monitor an amount of use of virtual computing resources of the virtual machine instance 3000. For another example, the controller 140 may select a current mode of the virtual machine instance 3000 based on the operation status of the virtual machine instance 3000. For another example, the controller 140 may transmit a control signal for selecting and changing the mode of the virtual machine instance 3000 to the virtual machine instance 3000 based on the operation of the virtual machine instance 3000. For another example, the controller 140 may control the virtual computing resources of the virtual machine instance 3000.

According to an embodiment, the controller 140 may determine the provision state of the cloud service provided using the virtual machine instance 3000.

According to an embodiment, the controller 140 may obtain information about the virtual machine instance 3000 that executes a process to provide the cloud service. In addition, the controller 140 may obtain information about whether the virtual computing resources allocated to the virtual machine instance 3000 are active and information about a degree of use.

According to an embodiment, the controller 140 may select the mode of the virtual machine instance 3000. For example, the controller 140 may determine the mode of the virtual machine instance 3000 as one of an active mode, a sleep mode, a deep sleep mode, and a suspend mode.

According to an embodiment, the controller 140 may select the mode of the virtual machine instance 3000 based on a result of determining whether to activate the cloud service provided using the virtual machine instance 3000.

According to an embodiment, the controller 140 may select the mode of the virtual machine instance 3000 based on at least one of the service request received from a client device and the type, characteristic, importance, and frequency of use of a service provided using the virtual machine instance 3000.

According to an embodiment, the controller 140 may select the mode of the virtual machine instance 3000 and activate or deactivate some of the computing resources allocated to the virtual machine instance 3000 based on a result of selection.

According to an embodiment, the controller 140 may migrate data stored in some of the computing resources to other ones in order to activate or deactivate some of the allocated computing resources.

According to an embodiment, the controller 140 may estimate a load of the virtual machine instance 3000 based on a request of the cloud service, and manage the computing resources of the virtual machine instance 30000 such that a process related to the cloud service is performed based on the estimated load.

The cloud servers 300a, 300b, and 300n, which are servers that provide cloud computing services to the client device 200, may provide the cloud service requested through the client device 200 to the user through the Internet by using the virtual machine instance 3000. The cloud servers 300a, 300b, and 300n may provide the computing resources allocated to the virtual machine instance 3000.

Figure 3:
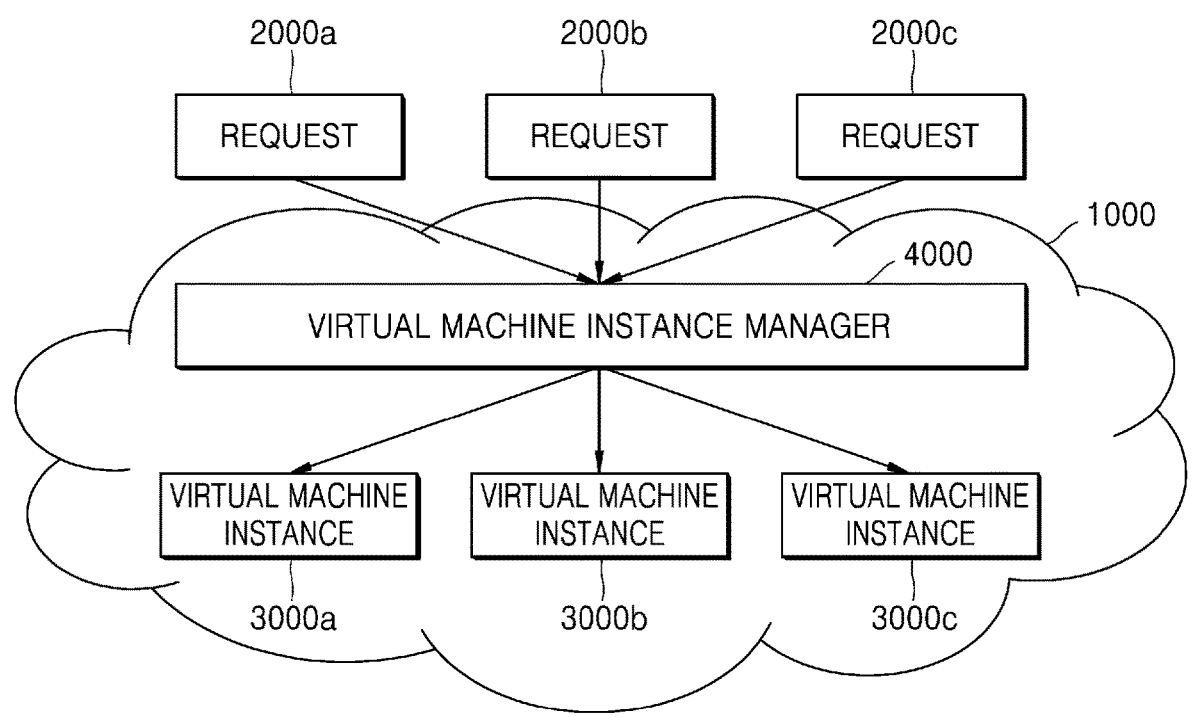
FIG. 3 is a conceptual diagram of a method of providing a cloud service using a virtual machine instance, according to some embodiments.

FIG. 3 is a conceptual diagram of a method of providing a cloud service using a virtual machine instance, according to some embodiments.

In the related art, a virtual machine instance 3000a directly receives a request 2000a for a cloud service provided using the virtual machine instance 3000a. Therefore, there is a problem that the virtual machine instance 3000a needs to be in an active mode even when it is not used for a long time because it is not known when the request 2000a will be received.

Referring to FIG. 3, the cloud service providing device 1000 may provide the cloud service to a user by using a virtual machine instance manager 4000 and the virtual machine instance 3000.

According to an embodiment, the virtual machine instance manager 4000 may be a physical device. Alternatively, the virtual machine instance manager 4000 may be a virtual machine generated by at least one server that provides the cloud service.

According to an embodiment, the virtual machine instance manager 4000 may control the overall operation of the virtual machine instance 3000. For example, the virtual machine instance manager 4000 may generate, end, and manage the virtual machine instance 3000. For another example, the virtual machine instance manager 4000 may monitor the operation status of the virtual machine instance 3000. That is, the virtual machine instance manager 4000 may monitor an amount of use of virtual computing resources of the virtual machine instance 3000. For another example, the virtual machine instance manager 4000 may select a current mode of the virtual machine instance 3000 based on the operation status of the virtual machine instance 3000. For another example, the virtual machine instance manager 4000 may select the mode of the virtual machine instance 3000 based on the operation of the virtual machine instance 3000 and transmit a control signal for changing the mode of the virtual machine instance 3000 to the selected mode to the virtual machine instance 3000. For another example, the virtual machine instance manager 4000 may control the virtual computing resources of the virtual machine instance 3000.

According to an embodiment, the virtual machine instance manager 4000 may receive a request 2000a regarding a cloud service provided using a virtual machine instance 3000a, a request 2000b regarding a cloud service provided using a virtual machine instance 3000b, and a request 2000c regarding a cloud service provided using a virtual machine instance 3000c. The virtual machine instance manager 4000 may transfer the received requests 2000a, 2000b, and 2000c to the virtual machine instances 3000a, 3000b, and 3000c related to the requests 2000a, 2000b, and 2000c respectively. The virtual machine instances 3000a, 3000b, and 3000c may perform processes regarding the cloud services based on the transferred requests 2000a, 2000b, and 2000c respectively.

According to an embodiment, when the virtual machine instance manager 4000 transmits service requests to the virtual machine instances 3000a, 3000b, and 3000c, the virtual machine instance manager 4000 may transmit control signals for changing modes of the virtual machine instances 3000a, 3000b, and 3000c to an active mode to the virtual machine instances 3000a, 3000b, and 3000c respectively. The virtual machine instances 3000a, 3000b, and 3000c may change the modes of the virtual machine instances 3000a, 3000b, and 3000c to the active mode based on the control signals received from the virtual machine instance manager 4000.

According to an embodiment, when the virtual machine instance 3000 changes the mode of the virtual machine instance 3000 to the active mode, the virtual machine instance 3000 may activate the virtual computing resources allocated to the virtual machine instance 3000. For example, the virtual machine instance 3000 may migrate and activate some of data stored in vDisk among the virtual computing resources allocated to the virtual machine instance 3000 to vCPU and vRAM.

Because the virtual machine instances 3000a, 3000b, and 3000c do not directly receive the requests 2000a, 2000b, and 2000c regarding the cloud services, when receiving the requests 2000a, 2000b, and 2000c regarding the cloud services, the virtual machine instances 3000a, 3000b, and 3000c that are not in the active mode may perform the processes regarding the cloud services The modes of the virtual machine instances 3000a, 3000b, and 3000c are described below with reference to FIG. 7.

Figure 4:
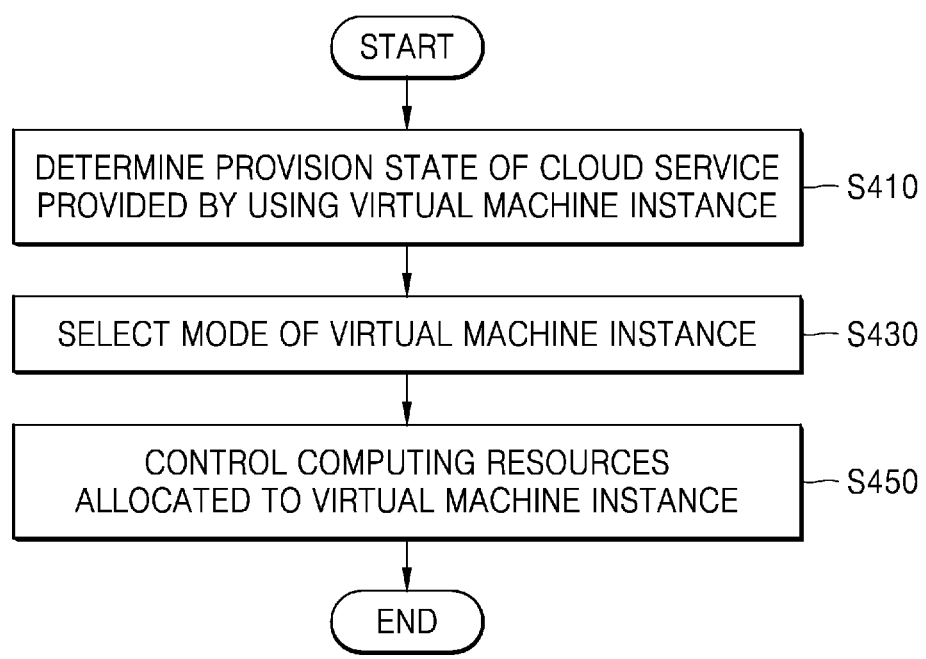
FIG. 4 is a flowchart of a method of controlling computing resources of at least one cloud server that provides a cloud service by using a virtual machine instance, according to some embodiments.

FIG. 4 is a flowchart of a method of controlling computing resources of at least one cloud server that provides a cloud service by using the virtual machine instance 3000, according to some embodiments.

Referring to operation S410, the electronic device 100 may determine a provision state of the cloud service provided by using the virtual machine instance 3000.

According to an embodiment, the electronic device 100 may obtain information about the virtual machine instance 3000 that performs a process so as to provide the cloud service. In addition, the electronic device 100 may obtain information about whether the virtual computing resources allocated to the virtual machine instance 3000 are active and information about a degree of use.

According to an embodiment, the electronic device 100 may determine the provision state of the cloud service based on the obtained information about whether the virtual computing resources allocated to the virtual machine instance 3000 are active and information about the degree of use. For example, when the virtual computing resources allocated to the virtual machine instance 3000 are in an inactive state, the electronic device 100 may determine that the cloud service is not provided. For another example, when an amount of use of the virtual computing resources allocated to the virtual machine instance 3000 is less than a predetermined value, the electronic device 100 may determine that the cloud service is not provided.

Referring to operation S430, the electronic device 100 may select a mode of the virtual machine instance 3000.

According to an embodiment, the electronic device 100 may select the mode of the virtual machine instance 3000 based on a result of determining whether to activate the cloud service provided using the virtual machine instance 3000. For example, the electronic device 100 may determine the mode of the virtual machine instance 3000 as one of an active mode, a sleep mode, a deep sleep mode, and a suspend mode. The mode of the virtual machine instance 3000 is described below with reference to FIG. 7.

According to an embodiment, the electronic device 100 may select the mode of the virtual machine instance 3000 based on a service request for a service provided by using the virtual machine instance 3000. The electronic device 100 may select the mode of the virtual machine instance 3000 based on at least one of a time at which the service corresponding to the service request is provided and a characteristic of the service corresponding to the service request. In this case, the characteristic of the service may include at least one of the type, characteristic, importance, and frequency of use of the service provided by using the virtual machine instance 3000. This is in detail described below with reference to FIG. 5.

Referring to operation S450, the electronic device 100 may control computing resources allocated to the virtual machine instance 3000.

According to an embodiment, the electronic device 100 may select the mode of the virtual machine instance 3000 and activate or deactivate some of the computing resources allocated to the virtual machine instance 3000 based on a result of selection. In addition, the electronic device 100 may migrate data stored in some of the computing resources to other ones in order to activate or deactivate some of the allocated computing resources. This is in detail described below with reference to FIG. 6.

Figure 5:
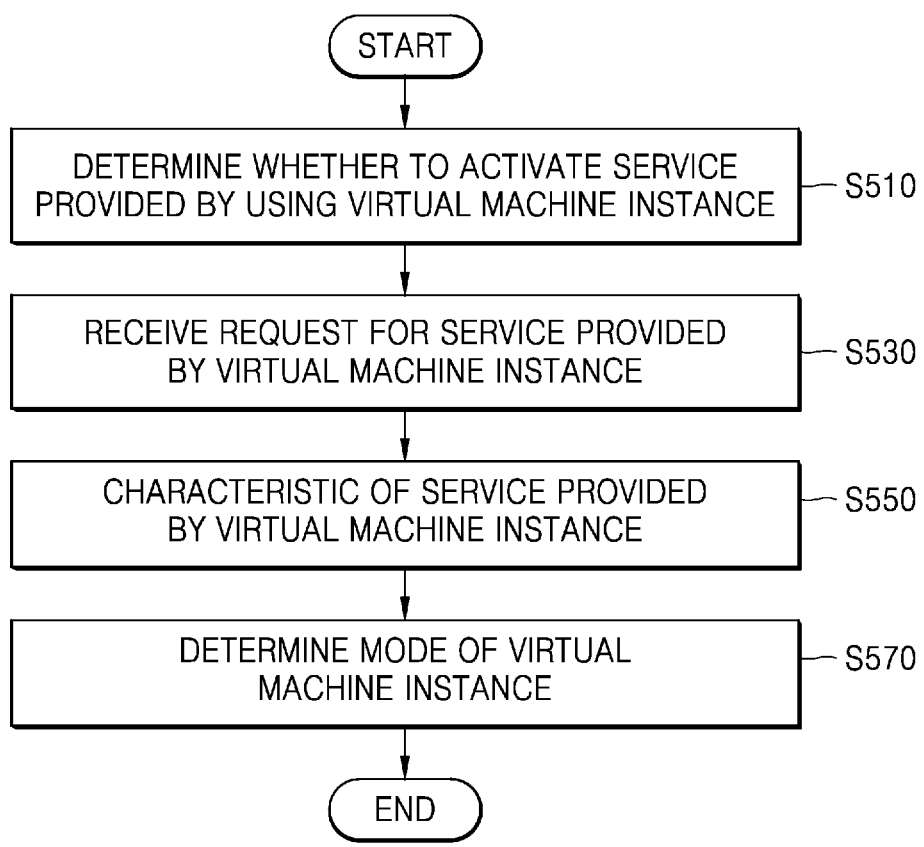
FIG. 5 is a flowchart of a method of selecting a mode of a virtual machine instance, according to some embodiments

FIG. 5 is a flowchart of a method of selecting a mode of the virtual machine instance 3000, according to some embodiments.

Referring to FIG. 5, the electronic device 100 may select the mode of the virtual machine instance 3000 based on a service request for a service provided by the virtual machine instance 3000. In addition, the electronic device 100 may select the mode of the virtual machine instance 3000 based on whether to activate a cloud service provided by using the virtual machine instance 3000, a received request for a service provided by the virtual machine instance 3000, and characteristics of the service provided by the virtual machine instance 3000. However, this is only an example of what is considered when the electronic device 100 selects the mode of the virtual machine instance 3000, and is not limited thereto. The electronic device 100 may select the mode of the virtual machine instance 3000 without considering all the above-described examples. In addition, the electronic device 100 may select the mode of the virtual machine instance 3000 in consideration of more items than those described above.

According to an embodiment, the mode of the virtual machine instance 3000 may include an active mode, a sleep mode, a deep sleep mode, and a suspend mode, but is not limited thereto. The mode of the virtual machine instance 3000 is described below with reference to FIG. 7.

Referring to operation S510, the electronic device 100 may determine whether to activate the cloud service provided by using the virtual machine instance 3000.

According to an embodiment, the electronic device 100 may monitor an operation status of the virtual machine instance 3000. Specifically, the electronic device 100 may monitor processes running in the virtual machine instance 3000. The electronic device 100 may monitor an amount of use of the virtual computing resources allocated to the virtual machine instance 3000 in real time. The electronic device 100 may monitor the request from a client for the service provided by using the virtual machine instance 3000.

According to an embodiment, the electronic device 100 may determine whether to activate the cloud service provided by using the virtual machine instance 3000 based on the operation status of the virtual machine instance 3000. For example, the electronic device 100 may determine whether to activate the cloud service based on the type of the process running in the virtual machine instance 3000. For another example, the electronic device 100 may determine whether to activate the cloud service based on the amount of use of the virtual computing resources allocated to the virtual machine instance 3000. Specifically, when the amount of use of the virtual computing resources allocated to the virtual machine instance 3000 is less than a predetermined value, the electronic device 100 may determine that the cloud service is not provided.

According to an embodiment, the electronic device 100 may determine whether to activate the cloud service provided by using the virtual machine instance 3000 based on whether to activate at least some of the virtual computing resources allocated to the virtual machine instance 3000. For example, when a vCPU resource is not activated among the virtual computing resources allocated to the virtual machine instance 3000, the electronic device 100 may determine that the cloud service provided by using the virtual machine instance 3000 is not activated.

Referring to operation S530, the electronic device 100 may select the mode of the virtual machine instance 3000 based on the service request 2000*a*, 2000*b*, and 2000*c* for the service provided by the virtual machine instance 3000 received from the client device 200. The electronic device 100 may select the mode of the virtual machine instance 3000 based on at least one of a time at which the service corresponding to the service request 2000*a*, 2000*b*, and 2000*c* is provided and a characteristic of the service corresponding to the service request.

According to an embodiment, when the electronic device 100 receives the service request 2000*a*, 2000*b*, and 2000*c*, the electronic device 100 may select the mode of the virtual machine instance 3000 as the active mode.

According to an embodiment, the electronic device 100 may select the mode of the virtual machine instance 3000 as the sleep mode based on the completion of the process of the virtual machine instance 3000 required for providing the cloud service.

According to an embodiment, the electronic device 100 may select the mode of the virtual machine instance 3000 based on information included in the service request 2000*a*, 2000*b*, and 2000*c*.

For example, when information about the time required for the process of the virtual machine instance 3000 is information included in the service request 2000*a*, 2000*b*, and 2000*c*, the electronic device 100 may select the mode of the virtual machine instance 3000 as the active mode during the time required for the process of the virtual machine instance 3000. When the time that the process of the virtual machine instance 3000 is performed exceeds the time required for the process of the virtual machine instance 3000, the electronic device 100 may select the mode of the virtual machine instance 3000 as the sleep mode.

For another example, information about the time at which the process of the virtual machine instance 3000 is performed may be the information included in the service request 2000*a*, 2000*b*, and 2000*c*. The time at which the service corresponding to the service request 2000*a*, 2000*b*, and 2000*c* starts may be the information included in the service request 2000*a*, 2000*b*, and 2000*c*. When the time at which the process of the virtual machine instance 3000 is performed and the current time correspond to each other, the electronic device 100 may select the mode of the virtual machine instance 3000 as the active mode. When the time at which the service starts corresponds to the current time, the electronic device 100 may select the mode of the virtual machine instance 3000 as the active mode.

For another example, information about the time at which the process of the virtual machine instance 3000 ends may be information about a request for the cloud service. When the time at which the process of the virtual machine instance 3000 ends and the current time correspond to each other, the electronic device 100 may select the mode of the virtual machine instance as the sleep mode.

According to an embodiment, when the service request 2000a, 2000b, and 2000c is not received for a preset period, the electronic device 100 may select the mode of the virtual machine instance 3000 as the sleep mode.

Referring to operation S550, the electronic device 100 may select the mode of the virtual machine instance 3000 based on a characteristic of the cloud service provided by using the virtual machine instance 3000. The characteristic of the service may include at least one of the type, property, importance, and frequency of use of the service.

According to an embodiment, the type of the cloud service may mean the type of a service that a user uses a virtual computing resource allocated to the virtual machine instance 3000. For example, the cloud service may include creating a web server and operating a homepage. In addition, the cloud service may provide a computer that conducts tests that operate with limited computing resources. In addition, the cloud service may provide a computer that runs an automated product sorting system. In addition, the cloud service may provide a video streaming server. In addition, the cloud service may provide a computer that performs deep learning to read an image. In addition, the cloud service may include backing up data of the client device 200. In addition, the cloud service may include backing up a database constituting the web server. However, this is merely an example of a cloud service that may be provided by using a cloud system, but is not limited thereto.

According to an embodiment, the cloud service for backing up the data of the client device 200 is provided at a time at which the user does not use the client device 200. In addition, the time for backing up the data is significantly less than the time for not backing up the data. Therefore, the virtual machine instance 3000 that provides the cloud service for backing up the data of the client device 200 may be in the active mode only when a service request for backing up the data is received. Therefore, when the electronic device 100 receives the service request for backing up the data from the client device 200, the electronic device 100 may determine the mode of the virtual machine instance 3000 as the active mode.

According to an embodiment, the electronic device 100 may select the mode of the virtual machine instance 3000 based on types of a plurality of additional services included in one cloud service. For example, a cloud service for providing a web server that operates an Internet shopping mall homepage may include an additional service that operates a main homepage, an additional service that operates a product display homepage, an additional service that supports payment of a product, and an additional service for providing a bulletin board such as a product review of the user. The additional services may be provided to the user by the virtual machine instance 3000 respectively corresponding to the additional services.

According to an embodiment, the additional service for providing the web server that operates the main homepage of the Internet shopping mall homepage is provided such that the user may connect to the web server at any time. That is, the virtual machine instance 3000 that provides the web server that operates the main homepage is always in the active mode. Therefore, the electronic device 100 may always select the mode of the virtual machine instance 3000 that provides the web server that operates the main homepage as the active mode.

According to an embodiment, a service providing a B2B bulletin board is provided only when necessary among additional services that provide the web server that operates the internet shopping mall homepage. That is, the virtual machine instance 3000 that provides the service for providing the B2B bulletin board is in the active mode only when a service request for calling the B2B bulletin board is received. Therefore, the electronic device 100 may select the mode of the virtual machine instance 3000 that provides the service for providing the B2B bulletin board as the active mode only when the service request for calling the B2B bulletin board is received.

According to an embodiment, the electronic device 100 may select the mode of the virtual machine instance 3000 according to the property of the cloud service. For example, the electronic device 100 may always select the mode of the virtual machine instance 3000 related to the service that operates the main homepage as the active mode. For another example, the electronic device 100 may select the mode of the virtual machine instance 3000 related to a service for providing a product inquiry bulletin board as the sleep mode at a specific time such as late night time. For another example, the electronic device 100 may select the mode of the virtual machine instance 3000 related to a service for backing up a database of the homepage as the active mode at a specific time such as late night time. For another example, the electronic device 100 may select the mode of the virtual machine instance 3000 that provides a service for providing the B2B bulletin board as the active mode only when the request for calling the B2B bulletin board is received.

According to an embodiment, the electronic device 100 may select the mode of the virtual machine instance 3000 according to the importance of the cloud service. For example, in the Internet shopping mall homepage, the main homepage of the shopping mall may have the highest importance, a product introduction page and a product settlement page have the next highest importance, a product review writing board may have a relatively low importance, and the B2B bulletin board may have the lowest importance.

According to an embodiment, the electronic device 100 may select the mode of the virtual machine instance 3000 that provides a service of low importance as the sleep mode. The electronic device 100 may easily set a condition for occurrence of an event for determining the mode of the virtual machine instance 3000 that provides the service of low importance as the sleep mode (e.g., a condition that a service providing request is not received for 12 hours). The electronic device 100 may with difficulty set a condition for occurrence of an event for determining the mode of the virtual machine instance 3000 that provides a service of high importance as the sleep mode (e.g., a condition that a service providing request is not received for one month). In addition, the electronic device 100 may select the mode of the virtual machine instance 3000 that provides the service of low importance as the deep sleep mode. The sleep mode and deep sleep mode will be described below with reference to FIG. 7.

According to an embodiment, the electronic device 100 may select the mode of the virtual machine instance 3000 according to the frequency of providing the cloud service. For example, in the Internet shopping mall homepage, the service providing frequency of the main homepage of the shopping mall is the highest, the service providing frequency of the product introduction page and the product settlement page is next highest, the service providing frequency of the product review writing bulletin board is relatively low, and the service providing frequency of the B2B bulletin board is the lowest. The electronic device 100 may select the mode of the virtual machine instance 3000 that provides the B2B bulletin board and the product writing bulletin board which have a low service providing frequency as the sleep mode. The electronic device 100 may easily set a condition for occurrence of an event for determining the mode of the virtual machine instance 3000 that provides the service of low importance as the sleep mode. In addition, the electronic device 100 may select the mode of the virtual machine instance 3000 that provides the service of the low service providing frequency as the deep sleep mode. The sleep mode and the deep sleep mode will be described below with reference to FIG. 7.

Figure 6:
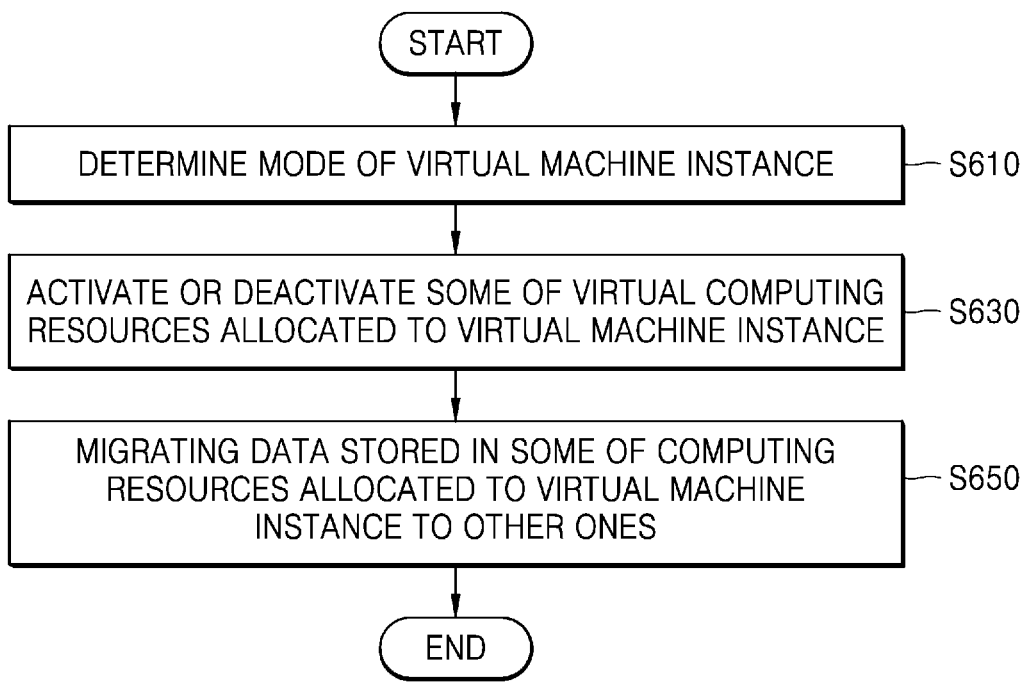
FIG. 6 is a flowchart of a method of controlling computing resources allocated to a virtual machine instance, according to some embodiments.

FIG. 6 is a flowchart of a method of controlling computing resources allocated to the virtual machine instance 3000, according to some embodiments.

Referring to operation S610, the electronic device 100 may select a mode of the virtual machine instance 3000. It is described above that the electronic device 100 selects the mode of the virtual machine instance 3000, and thus a redundant description is omitted.

Referring to operation S630, the electronic device 100 may activate or deactivate some of the virtual computing resources allocated to the virtual machine instance 3000 based on the determined mode of the virtual machine instance 3000, thereby controlling the computing resources (e.g., vCPU, vRAM, vDisk, and vNIC) allocated to the virtual machine instance 3000.

According to an embodiment, the electronic device 100 may newly generate the virtual machine instance 3000 for providing a cloud service and allocate virtual computing resources to the virtual machine instance 3000. Virtual resources may be allocated from cloud computing resources.

According to an embodiment, the electronic device 100 may activate or deactivate at least one of vCPU, vRAM, vDisk, and vNIC which are the virtual computing resources allocated to the virtual machine instance 3000 for providing the cloud service, thereby allocating the virtual computing resources. For example, when the electronic device 100 determines the mode of the virtual machine instance 3000 as a sleep mode, the electronic device 100 may deactivate vCPU and vRAM among the virtual computing resources of the virtual machine instance 3000. For another example, when the electronic device 100 determines the mode of the virtual machine instance 3000 as an active mode, the electronic device 100 may activate the virtual computing resources of the virtual machine instance 3000.

Referring to operation S650, the electronic device 100 may control the computing resources allocated to the virtual machine instance 3000 by migrating data stored in some of the computing resources allocated to the virtual machine instance 3000.

According to an embodiment, the electronic device 100 may migrate the data stored in some of vCPU, vRAM, vDisk, and vNIC which are the virtual computing resources allocated to the virtual machine instance 3000 for providing the cloud service, thereby controlling the computing resources allocated to the virtual machine instance 3000. For example, when the electronic device 100 determines the mode of the virtual machine instance 3000 as a sleep mode, the electronic device 100 may migrate the data stored in vCPU and vRAM among the virtual computing resources of the virtual machine instance 3000 to vDisk, thereby controlling the computing resources allocated to the virtual machine instance 3000. For another example, when the electronic device 100 determines the mode of the virtual machine instance 3000 as a deep sleep mode, the electronic device 100 may migrate the data stored in some of vCPU among the virtual computing resources of the virtual machine instance 3000 to vDisk, thereby controlling the computing resources allocated to the virtual machine instance 3000. For another example, when the electronic device 100 determines the mode of the virtual machine instance 3000 as an active mode, the electronic device 100 may migrate the data migrated to vDisk to vCPU and vRAM, thereby controlling the computing resources allocated to the virtual machine instance 3000.

In the related art, only the active mode and a suspended mode exist in the virtual machine instance 3000. Because the data of vCPU and vRAM among the virtual computing resources is not migrated to vDisk in the suspend mode, there is a problem that it takes long time when the mode of the virtual machine instance 3000 changes from the suspended mode to the active mode. In addition, there is a problem that a user needs to perform a process that was performed by the virtual machine instance 3000.

However, in the embodiment, when the mode of the virtual machine instance 3000 changes from the active mode to the sleep mode or the deep sleep mode, data stored in some (e.g., at least one of vCPU and vRAM) of the virtual computing resources may be migrated to other ones (e.g., vDisk). In addition, when the mode of the virtual machine instance 3000 changes from the sleep mode or the deep sleep mode to the active mode, data stored in some (e.g., vDisk) of the virtual computing resources may be migrated to other ones (e.g., at least one of vCPU and vRAM). Therefore, the embodiment has an advantage in that the mode of the virtual machine instance 3000 quickly changes to the active mode. In addition, the disclosed embodiment has an advantage in that the process that was performed by the virtual machine instance 3000 is automatically performed again.

Figure 7:
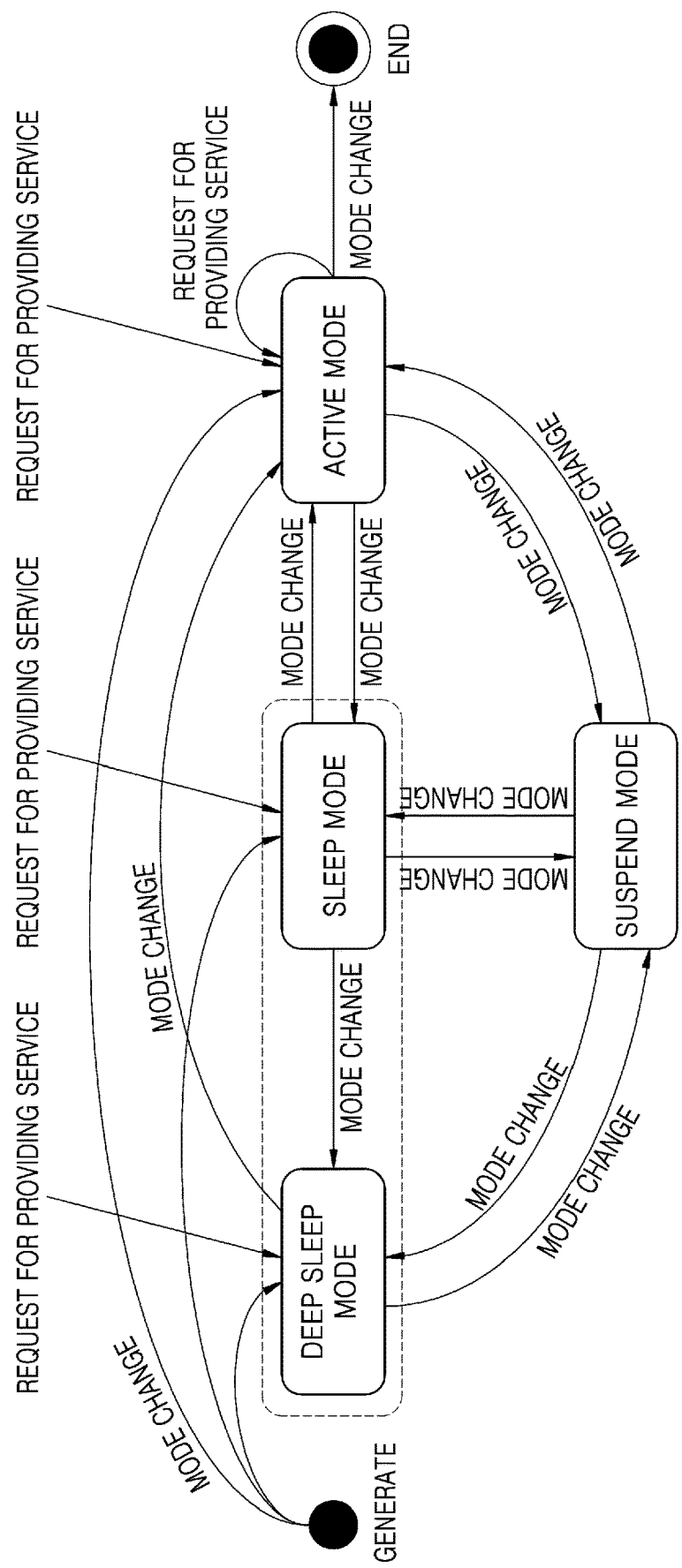
FIG. 7 is a conceptual diagram of a mode of a virtual machine instance, according to some embodiments.

FIG. 7 is a conceptual diagram of a mode of the virtual machine instance 3000, according to some embodiments.

Referring to FIG. 7, the mode of the virtual machine instance 3000 may include an active mode, a sleep mode, a deep sleep mode, and a suspend mode. The virtual machine instance manager 4000 may select the mode of the virtual machine instance 3000 and change the mode of the virtual machine instance 3000 to the determined mode. In addition, the virtual machine instance manager 4000 may control virtual computing resources of the virtual machine instance 3000 so as to correspond to the determined mode of the virtual machine instance 3000.

According to an embodiment, the virtual machine instance manager 4000 may change the mode of the virtual machine instance 3000 based on a control signal regarding the mode of the virtual machine instance 3000 received from the client device 200. For example, the virtual machine instance manager 4000 may change the mode of the virtual machine instance 3000 to the sleep mode based on the control signal for changing the mode of the virtual machine instance 3000 to the sleep mode received from the client device 200.

According to an embodiment, the virtual machine instance manager 4000 may select the mode of the virtual machine instance 3000 based on a request for a service received from the client device 200. The virtual machine instance manager 4000 may select the mode of the virtual machine instance 3000 based on at least one of a time at which a service corresponding to the service request is provided and a characteristic of the service corresponding to the service request.

According to an embodiment, the time at which the service corresponding to the service request is provided may include at least one of a time at which the service starts, a time for which the service is maintained, and a time between after providing of the service ends and before the service is provided again.

According to an embodiment, the characteristics of the service may include at least one of the importance of the service, the frequency of use of the service, the type of the service, and the property of the service.

According to an embodiment, the virtual machine instance manager 4000 may create the virtual machine instance 3000. The virtual machine instance manager 4000 may select the generated mode of the virtual machine instance 3000 as one of the active mode, the sleep mode, and the deep sleep mode. The virtual machine instance manager 4000 may allocate virtual computing resources to the virtual machine instance 3000 so as to correspond to the selected mode of the virtual machine instance 3000.

According to an embodiment, the active mode of the virtual machine instance 3000 is a mode in which a process for providing a cloud service is performed in response to a request received from the client device 200. The active mode of the virtual machine instance 3000 is a mode in which the virtual machine instance 3000 performs the process using all of the virtual computing resources (vCPU, vRAM, vDISK, and vNIC).

According to an embodiment, the virtual machine instance manager 4000 may change the active mode of the virtual machine instance 3000 to one of the sleep mode and the suspend mode. In addition, the virtual machine instance manager 4000 may end the virtual machine instance 3000.

According to an embodiment, the sleep mode of the virtual machine instance 3000 is a mode in which virtual computing resources are managed by deactivating some of the virtual computing resources of the virtual machine instance 3000. The sleep mode of the virtual machine instance 3000 is a mode in which the virtual machine instance manager 4000 migrates data stored in vCPU and vRAM among the virtual computing resources of the virtual machine instance 3000 to vDisk and controls the virtual computing resources of the virtual machine instance 3000.

According to an embodiment, when the virtual machine instance manager 4000 receives a service request for the cloud service using the virtual machine instance 3000 in the sleep mode, the virtual machine instance manager 4000 may change the mode of the virtual machine instance 3000 to the active mode. The virtual machine instance manager 4000 may migrate the data migrated to vDisk among the virtual computing resources of the virtual machine instance 3000 to vCPU and vRAM. The virtual machine instance 3000 may perform a process related to the provision of the cloud service by using the data migrated to vCPU and vRAM.

According to an embodiment, the virtual machine instance manager 4000 may change the sleep mode of the virtual machine instance 3000 to one of the deep sleep mode and the suspend mode.

According to an embodiment, the virtual machine instance manager 4000 may change the mode of the virtual machine instance 3000 from the sleep mode to the deep sleep mode based on whether an event relating to the cloud service provided by using the virtual machine instance 3000 occurs. For example, the virtual machine instance manager 4000 may change the mode of the virtual machine instance 3000 from the sleep mode to the deep sleep mode when the service request for the cloud service provided by using the virtual machine instance 3000 in the sleep mode is not received for a predetermined period.

According to an embodiment, the virtual machine instance manager 4000 may set an event condition for changing the sleep mode of the virtual machine instance 3000 to the deep sleep mode based on the characteristics of the cloud service provided by using the virtual machine instance 3000. For example, the virtual machine instance manager 4000 may set the event condition based on the type, property, importance, and frequency of use of the cloud service provided by using the virtual machine instance 3000.

According to an embodiment, the deep sleep mode of the virtual machine instance 3000 is a mode in which the virtual computing resources of the virtual machine instance 3000 are managed by deactivating some of the virtual computing resources. The deep sleep mode of the virtual machine instance 3000 is a mode in which the virtual machine instance manager 4000 migrates the data stored in vCPU among the virtual computing resources of the virtual machine instance 3000 to vDisk and controls the virtual computing resources of the virtual machine instance 3000.

According to an embodiment, when the virtual machine instance manager 4000 receives a request for the cloud service using the virtual machine instance 3000 in the deep sleep mode, the virtual machine instance manager 4000 may change the mode of the virtual machine instance 3000 to the active mode. The virtual machine instance manager 4000 may migrate the data migrated to vDisk among the virtual computing resources of the virtual machine instance 3000 to vCPU. The virtual machine instance 3000 may perform the process related to providing of the cloud service by using the data migrated to vCPU.

When the deep sleep mode of the virtual machine instance 3000 is compared to the sleep mode, the data stored in vRAM is not migrated to vDisk. Therefore, it takes longer time to change from the deep sleep mode of the virtual machine instance 3000 to the active mode. However, because in the deep sleep mode of the virtual machine instance 3000, the data stored in vRAM is not migrated to vDisk, there is an advantage of consuming less virtual computing resources.

According to an embodiment, the virtual machine instance manager 4000 may change the sleep mode of the virtual machine instance 3000 to the suspend mode.

According to an embodiment, the suspend mode of the virtual machine instance 3000 is a mode in which the virtual computing resources of the virtual machine instance 3000 are managed by deactivating some of the virtual computing resources. The suspend mode of the virtual machine instance 3000 is a mode in which the virtual machine instance manager 4000 deletes the data stored in vCPU and vRAM among the virtual computing resources of the virtual machine instance 3000 and controls the virtual computing resources of the virtual machine instance 3000 without migrating the data to vDisk, in the same manner as the suspend mode of the virtual machine instance 3000 in the related art.

According to an embodiment, the virtual machine instance manager 4000 may change the suspend mode of the virtual machine instance 3000 to one of the active mode, the sleep mode, and the deep sleep mode based on a control signal for changing the mode of the virtual machine instance 3000 from the client device 200.

According to an embodiment, the virtual machine instance manager 4000 may change one of the active mode, the sleep mode, and the deep sleep mode of the virtual machine instance 3000 to the suspend mode based on the control signal for changing the mode of the virtual machine instance 3000 from the client device 200.

Figure 8:
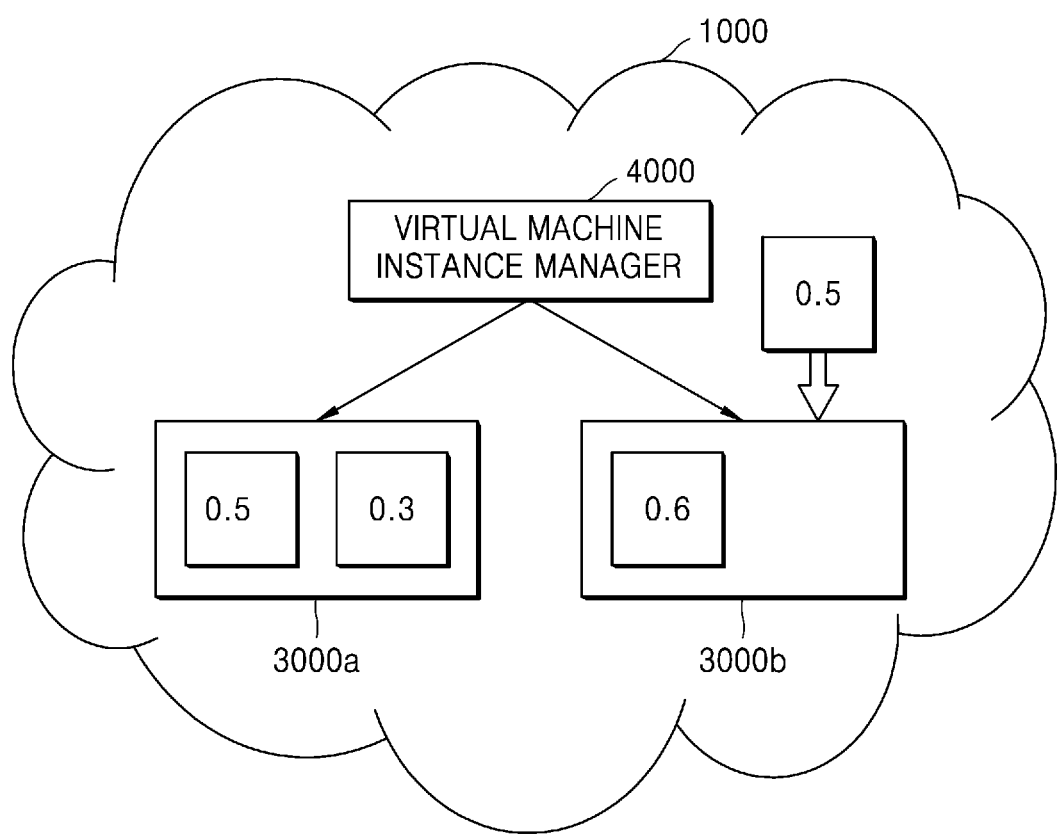
FIGS. 8, 9, and 10 are conceptual diagrams of a method of managing computing resources allocated to virtual machine instances, according to some embodiments.
Figure 9:
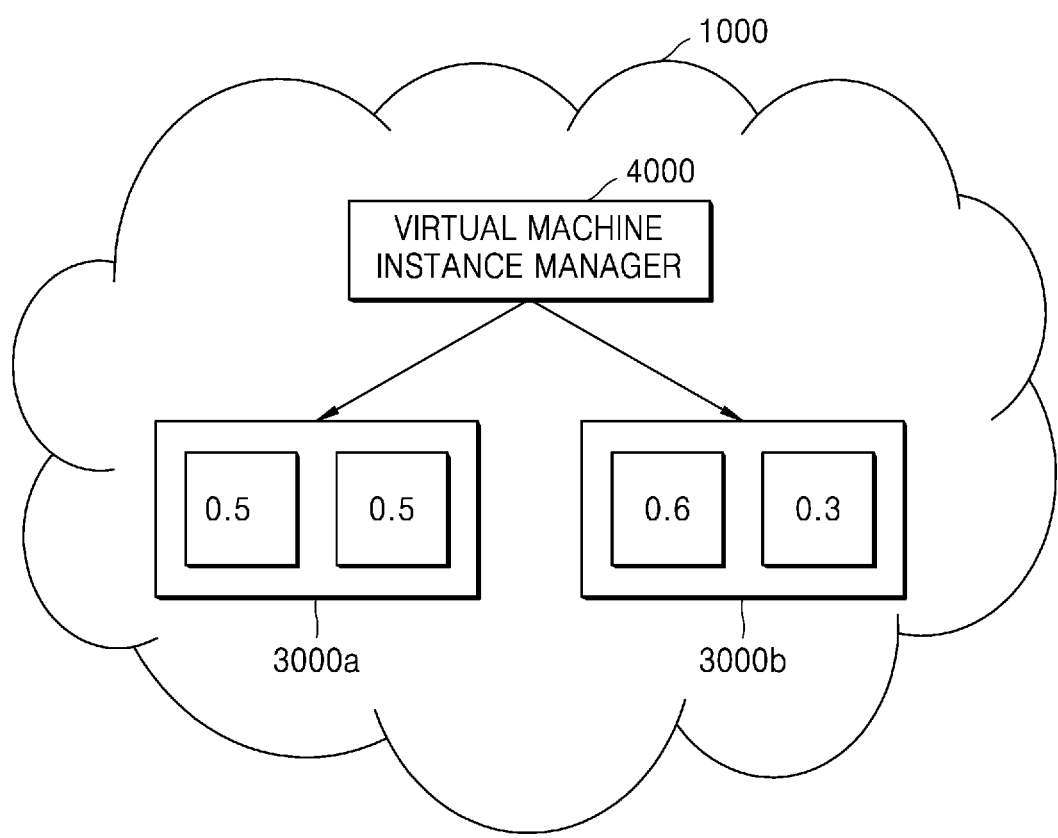
Figure 10:
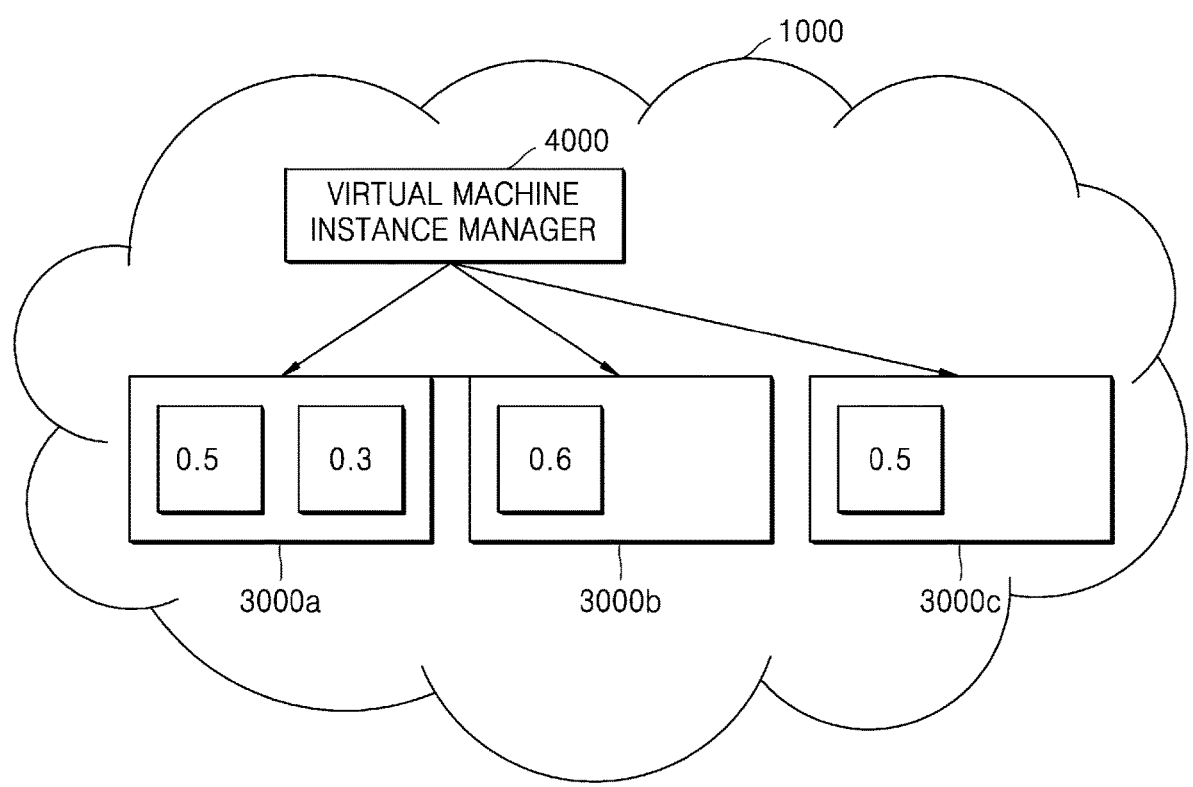

FIGS. 8 through 10 are conceptual diagrams of a method of managing computing resources allocated to the virtual machine instances 3000, 3000*a*, 3000*b*, and 3000*c*, according to some embodiments.

Referring to FIG. 8, the virtual machine instance manager 4000 and the virtual machine instances 3000*a* and 3000*b* may be generated in the cloud service providing device 1000. The virtual machine instances 3000*a* and 3000*b* may perform a process for providing a cloud service. For example, when the total executable load 1, the virtual machine instance 3000*a* is performing a process with loads of 0.5 and 0.3, and the virtual machine instance 3000*b* is performing a process with a load of 0.6. When the virtual machine instance manager 4000 needs to perform a new process with a load of 0.5, the virtual machine instance manager 4000 may manage computing resources allocated to the virtual machine instances 3000*a* and 3000*b* as illustrated in FIG. 9 or 10.

Referring to FIG. 9, the virtual machine instance manager 4000 may manage the computing resources of the virtual machine instances 3000*a* and 3000*b* such that the virtual machine instance 3000*b* performs a process with a load of 0.3 that is being performed by the virtual machine instance 3000*a*. In addition, the virtual machine instance manager 4000 may manage the computing resources of the virtual machine instance 3000*a* such that the virtual machine instance 3000*a* performs a new process with a load of 0.5.

Referring to FIG. 10, the virtual machine instance manager 4000 may create the new virtual machine instance 3000*c* and manage the computing resources of the virtual machine instance 3000*c* such that the virtual machine instance 3000*c* performs a new process with a load of 0.5.

That is, the virtual machine instance manager 4000 may estimate the load of the virtual machine instance 3000 based on a request of the cloud service, and manage computing resources of the virtual machine instance 3000 such that a process related to the cloud service is performed based on the estimated load.

Meanwhile, the disclosed embodiment may be used to provide a web server for operating an Internet shopping mall homepage as the cloud service. For example, the cloud service providing device 1000 may generate the virtual machine instance manager 4000, a virtual machine instance for operating a shopping mall main homepage, a virtual machine instance for operating a product display homepage, a virtual machine instance for supporting payment of a product, and a virtual machine instance for providing a bulletin board such as a product review. When the virtual machine instance manager 4000 does not receive a request for using the bulletin board from the client device 200 for a preset time, the virtual machine instance manager 4000 may change a mode of the virtual machine instance for providing the bulletin board to a sleep mode. In addition, the virtual machine instance manager 4000 may deactivate some of virtual computing resources of the virtual machine instance for providing the bulletin board. When receiving the request for using the bulletin board from the client device 200, the virtual machine instance manager 4000 may change the mode of the virtual machine instance from the sleep mode to an active mode. The virtual machine instance manager 4000 may activate some of the deactivated virtual computing resources.

Meanwhile, the disclosed embodiment may be used to provide a device for sorting items in a distribution center as a cloud service. For example, the cloud service providing device 1000 may generate the virtual machine instance manager 4000, a virtual machine instance for sorting received items, a virtual machine instance for analyzing newly received items, and a virtual machine instance for sorting the sorted items according to destinations thereof. The virtual machine instance manager 4000 may determine a mode of the virtual machine instance for analyzing newly received items as the sleep mode. When new items are received, the virtual machine instance manager 4000 may change the virtual machine instance for analyzing the new items from the sleep mode to the active mode. The virtual machine instance for analyzing the new items may analyze the new items through deep learning. A deep learning cloud service uses more computing resources than other cloud services. Therefore, the virtual machine instance manager 4000 may change the virtual machine instance from the active mode to the sleep mode when deep learning performed by the virtual machine instance ends.

Meanwhile, the disclosed embodiment may be used to provide a plurality of devices for determining compatibility of applications as the cloud service. For example, the cloud service providing device 1000 may generate the virtual machine instance manager 4000 and a plurality of virtual machine instances for providing a plurality of virtual computers to which different computing resources are allocated. The user may access a virtual machine instance that performs a virtual machine process by using the client device 200 to determine the compatibility of an application. When not receiving a request for accessing the virtual machine instance for a preset period of time, the virtual machine instance manager 4000 may change a mode of the virtual machine instance for which the request is not received from the active mode to the sleep mode.

Meanwhile, the disclosed embodiments may be implemented in the form of a computer readable recording medium storing instructions and data executable by a computer. The instructions may be stored in the form of program codes, and when executed by a processor, may generate a predetermined program module to perform a predetermined operation. In addition, the instructions may, when executed by a processor, perform certain operations of the disclosed embodiments.

What is claimed is:

1. An electronic device for managing computing resources of at least one cloud server that provides a cloud service by using a virtual machine instance, the electronic device comprising:
   a communicator comprising a communication circuit;
   a memory storing instructions; and
   a processor configured to execute the instructions stored in the memory to:
   receive, via the communicator, from a client device, at least one service request for a service provided by the virtual machine instance, execute, a process of the virtual machine instance for the service based on the received at least one service request,
change a modes of the virtual machine instance for managing the computing resources as a sleep mode, based on at least one of a time at which the service corresponding to the at least one service request is provided or a characteristic of the service corresponding to the at least one service request,
migrate data stored in a vCPU and a vRAM of the virtual machine instance to a vDisk of the virtual machine instance and deactivate the vCPU and the vRAM of the virtual machine instance, based on the changing to the sleep mode,
change the mode of the virtual machine instance from the sleep mode to a deep sleep mode when a service request for the service is not received from the client device for a predetermined period from the time when the mode of the virtual machine instance is changed to the sleep mode,
store only a data of the vCPU from among the migrated data to the vDisk, based on the changing to the deep sleep mode, and
migrate the data of the vCPU migrated to vDisk to the vCPU and execute the process of the virtual machine instance for the service by using the data migrated to the vCPU, when a service request for the service is received from the client device in the deep sleep mode,
wherein the virtual machine instance is generated by the at least one cloud server.

2. The electronic device of claim 1, wherein the time at which the service corresponding to the at least one service request is provided comprises at least one of a time at which the service starts, a time for which the service is maintained, or a time between after providing of the service ends and before the service is provided again.

3. The electronic device of claim 1, wherein the characteristic of the service comprises at least one of importance of the service, a frequency of use of the service, a type of the service, or a property of the service.

4. The electronic device of claim 1, wherein the processor is further configured to execute the instructions to set at least one of a time at which the service starts, a time for which the service is maintained, or a time between after providing of the service ends and before the service is provided again, based on the characteristic of the service provided by the virtual machine instance, and select the mode of the virtual machine instance based on the setting.

5. The electronic device of claim 1, wherein the processor is further configured to execute the instructions to select the mode of the virtual machine instance based on the characteristic of the service when providing of the service corresponding to the at least one service request is completed by the virtual machine instance.

6. The electronic device of claim 1, wherein the processor is further configured to execute the instructions to control the computing resources allocated to the virtual machine instance by activating or deactivating at least some of the computing resources allocated to the virtual machine instance.

7. A method of managing computing resources of at least one cloud server that provides a cloud service by using a virtual machine instance, the method comprising:
receiving, from a client device, at least one service request for a service provided by the virtual machine instance;
executing, a process of the virtual machine instance for the service based on the received at least one service request;
changing a modes of the virtual machine instance for managing of the computing resources as a sleep mode, based on at least one of a time at which the service corresponding to the at least one service request is provided or a characteristic of the service corresponding to the at least one service request;
migrating data stored in a vCPU and a vRAM of the virtual machine instance to a vDisk of the virtual machine instance and deactivating the vCPU and the vRAM of the virtual machine instance, based on the changing to the sleep mode,
changing the mode of the virtual machine instance from the sleep mode to a deep sleep mode when a service request for the service is not received from the client device for a predetermined period from the time when the mode of the virtual machine instance is changed to the sleep mode;
storing only a data of the vCPU from among the migrated data to the vDisk, based on the changing to the deep sleep mode; and
migrating the data of the vCPU migrated to vDisk to the vCPU and executing the process of the virtual machine instance for the service by using the data migrated to the vCPU, when a service request for the service is received from the client device in the deep sleep mode,
wherein the virtual machine instance is generated by the at least one cloud server.

8. The method of claim 7, wherein the time at which the service corresponding to the at least one service request is provided comprises at least one of a time at which the service starts, a time for which the service is maintained, or a time between after providing of the service ends and before the service is provided again.

9. The method of claim 7, wherein the characteristic of the service comprises at least one of importance of the service, a frequency of use of the service, a type of the service, or a property of the service.

10. The method of claim 7, wherein the selecting of one of the plurality of modes of the virtual machine instance comprises:
setting at least one of a time at which the service starts, a time for which the service is maintained, or a time between after providing of the service ends and before the service is provided again, based on the characteristic of the service provided by the virtual machine instance; and
selecting the mode of the virtual machine instance based on the setting.

11. The method of claim 7, wherein the selecting of one of the plurality of modes of the virtual machine instance comprises:
selecting the mode of the virtual machine instance based on the characteristic of the service when providing of the service corresponding to the at least one service request is completed by the virtual machine instance.

12. The method of claim 7, wherein the controlling of the computing resources allocated to the virtual machine instance comprises:
controlling the computing resources allocated to the virtual machine instance by activating or deactivating at least some of the computing resources allocated to the virtual machine instance.

13. A computer program product comprising a non-transitory computer readable storage medium, the computer readable storage medium comprising instructions for managing computing resources of at least one cloud server that provides a cloud service by using a virtual machine instance, wherein the managing of the computing resources of the at least one cloud server comprises:

receiving, from a client device, at least one service request for a service provided by the virtual machine instance;

executing, a process of the virtual machine instance for the service based on the received at least one service request;

changing a modes of the virtual machine instance for managing of the computing resources as a sleep mode, based on at least one of a time at which the service corresponding to the at least one service request is provided or a characteristic of the service corresponding to the at least one service request;

migrating data stored in a vCPU and a vRAM of the virtual machine instance to a vDisk of the virtual machine instance and deactivating the vCPU and the vRAM of the virtual machine instance, based on the changing to the sleep mode, changing the mode of the virtual machine instance from the sleep mode to a deep sleep mode when a service request for the service is not received from the client device for a predetermined period from the time when the mode of the virtual machine instance is changed to the sleep mode;

storing only a data of the vCPU from among the migrated data to the vDisk, based on the changing to the deep sleep mode; and migrating the data of the vCPU migrated to vDisk to the vCPU and executing the process of the virtual machine instance for the service by using the data migrated to the vCPU, when a service request for the service is received from the client device in the deep sleep mode, wherein the virtual machine instance is generated by the at least one cloud server.

* * * * *